(12) United States Patent
Roth et al.

(10) Patent No.: US 8,575,295 B2
(45) Date of Patent: Nov. 5, 2013

(54) GLOW-WIRE RESISTANT POLYAMIDES

(75) Inventors: Michael Roth, Lautertal (DE); Klaus Uske, Bad Dürkheim (DE)

(73) Assignee: BASF SE (DE)

( * ) Notice: Subject to any disclaimer, the term of this patent is extended or adjusted under 35 U.S.C. 154(b) by 69 days.

(21) Appl. No.: 13/328,446

(22) Filed: Dec. 16, 2011

(65) Prior Publication Data

US 2012/0157589 A1    Jun. 21, 2012

Related U.S. Application Data

(60) Provisional application No. 61/423,614, filed on Dec. 16, 2010.

(51) Int. Cl.
*C08G 65/08* (2006.01)
*C08G 65/14* (2006.01)

(52) U.S. Cl.
USPC .................................................. 528/101

(58) Field of Classification Search
USPC .................................................. 524/101
See application file for complete search history.

(56) References Cited

U.S. PATENT DOCUMENTS

| | | |
|---|---|---|
| 2,071,250 A | 2/1937 | Carothers |
| 2,071,251 A | 2/1937 | Carothers |
| 2,130,523 A | 9/1938 | Carothers |
| 2,130,948 A | 9/1938 | Carothers |
| 2,241,322 A | 5/1941 | Hanford |
| 2,312,966 A | 3/1943 | Hanford |
| 2,512,606 A | 6/1950 | Bolton et al. |
| 3,393,210 A | 7/1968 | Speck |
| 3,660,344 A | 5/1972 | Michael |
| 4,127,590 A | 11/1978 | Endo et al. |
| 4,148,846 A | 4/1979 | Owens et al. |
| 4,360,617 A | 11/1982 | Müller et al. |
| 4,396,742 A | 8/1983 | Binsack et al. |
| 4,537,949 A | 8/1985 | Schmidt et al. |
| 4,540,772 A | 9/1985 | Pipper et al. |
| 4,771,109 A | 9/1988 | Eichenauer et al. |
| 4,789,698 A | 12/1988 | Bonten et al. |
| 4,873,289 A | 10/1989 | Lindner et al. |
| 4,882,381 A | 11/1989 | Wittmann et al. |
| 5,010,135 A | 4/1991 | Eckel et al. |
| 6,184,282 B1 | 2/2001 | Gareiss et al. |
| 6,194,538 B1 | 2/2001 | Weiss et al. |
| 6,699,960 B1 | 3/2004 | Ohlbach et al. |
| 2006/0235191 A1 | 10/2006 | Deininger et al. |
| 2009/0012229 A1 | 1/2009 | Desbois et al. |
| 2010/0181696 A1 | 7/2010 | Glauner et al. |
| 2010/0234495 A1 | 9/2010 | Roth |

FOREIGN PATENT DOCUMENTS

| | | |
|---|---|---|
| DE | 1694254 A1 | 6/1971 |
| DE | 2646218 A1 | 4/1977 |
| DE | 2702661 A1 | 8/1977 |
| DE | 37 25 576 A1 | 2/1989 |
| DE | 38 00 603 A1 | 7/1989 |
| DE | 10313681 A1 | 10/2004 |
| EP | 0038094 A2 | 10/1981 |
| EP | 0038582 A2 | 10/1981 |
| EP | 0039524 A1 | 11/1981 |
| EP | 0 050 265 A1 | 4/1982 |
| EP | 129195 A2 | 12/1984 |
| EP | 129196 A2 | 12/1984 |
| EP | 208187 | 1/1987 |
| EP | 235690 A2 | 9/1987 |
| EP | 241 702 A1 | 10/1987 |
| EP | 299444 A2 | 1/1989 |
| EP | 0319290 A2 | 6/1989 |
| EP | 848 729 A1 | 6/1998 |
| EP | 922065 A2 | 6/1999 |
| EP | 1198491 A1 | 4/2002 |
| EP | 1994075 A2 | 11/2008 |
| JP | 2000/336132 A | 12/2000 |
| WO | WO-2008/119693 A1 | 10/2008 |
| WO | WO-2008/132111 A1 | 11/2008 |
| WO | WO-2009/109347 A1 | 9/2009 |

OTHER PUBLICATIONS

Ramsteiner, F., et al., "The Influence of Fibre Diameter on the Tensile Behaviour of Short-glass-fibre Reinforced Polymers," *Composites Science and Technology* (1985), vol. 24, pp. 231-240.

*Primary Examiner* — Terressa Boykin
(74) *Attorney, Agent, or Firm* — Novak Druce Connolly Bove + Quigg LLP

(57) ABSTRACT

Thermoplastic molding compositions comprising
  A) from 29 to 97.5% by weight of a thermoplastic polyamide,
  B) from 1 to 20% by weight of melamine cyanurate,
  C) from 0.5 to 10% by weight of an organic phosphorus compound based on 9,10-dihydro-9-oxa-10-phosphaphenanthrene oxide (DOPO) as parent structure,
  D) from 1 to 50% by weight of a fibrous filler, the aspect ratio (L/D) of which is from 4 to 25, and the arithmetic average fiber length of which is from 40 to 250 µm, and
  E) from 0 to 50% by weight of further additives,
where the total of the percentages by weight of components A) to E) is 100%.

8 Claims, No Drawings

GLOW-WIRE RESISTANT POLYAMIDES

CROSS-REFERENCE TO RELATED APPLICATIONS

This application claims benefit (under 35 USC 119(e)) of U.S. Provisional Application 61/423,614, filed Dec. 16, 2010 which is incorporated by reference.

BACKGROUND OF THE INVENTION

The invention relates to thermoplastic molding compositions comprising
A) from 29 to 97.5% by weight of a thermoplastic polyamide,
B) from 1 to 20% by weight of melamine cyanurate,
C) from 0.5 to 10% by weight of an organic phosphorus compound based on 9,10-dihydro-9-oxa-10-phosphaphenanthrene oxide (DOPO) as parent structure,
D) from 1 to 50% by weight of a fibrous filler, the aspect ratio (L/D) of which is from 4 to 25, and the arithmetic average fiber length of which is from 40 to 250 µm, and
E) from 0 to 50% by weight of further additives,
where the total of the percentages by weight of components A) to E) is 100%.

The invention further relates to the use of the molding compositions of the invention for producing fibers, foils, and moldings of any type, and also to the resultant moldings.

Polyamides equipped with fire resistance have recently been gaining importance. Products of particular interest here are those formulated in pale colors for the electrical sector. However, although red phosphorus and halogen compounds combined with synergists are known fire-protection systems they are unsuitable for this application sector. Halogen compounds impair electrical properties such as tracking resistance and dielectric strength. The intrinsic color of red phosphorus prevents its use for pale-colored formulations. DE-A 1694254 recommends addition of melamine to produce polyamides formulated in pale colors, without reinforcement but with flame retardancy. Melamine and melamine salts, e.g. melamine cyanurate, are less effective in glassfiber-reinforced polyamides, and the glow-wire resistance of said products is very low—especially when wall thicknesses are low.

Unreinforced molding compositions generally have higher glow-wire resistance but in contrast have the disadvantage of inadequate mechanical properties, such as stiffness and strength. Addition of glass fibers to polyamide mixtures with melamine cyanurate improves mechanical properties, but there is a disadvantageous effect on flame retardancy properties, since glass fibers cause drastic impairment of flame retardancy through what is known as the wicking effect. Correspondingly, EP-A 241 702 discloses that PA mixtures made of glass fibers with melamine cyanurate can be given improved flame retardancy performance by using short glass fibers without size in the mixture.

EP-A 848 729 discloses melamine cyanurate and short glass fibers with particular length distribution.

WO 2008/119693 and 2008/132111 disclose DOPO derivatives as flame retardants.

The effectiveness of flame retardancy additive mixtures is in essence described via fire tests to UL 94-V. However, for particular applications of flame-retardant polymers in installation work within buildings, and also in low-voltage switchgear, it is mainly the glow-wire test to IEC 60695-2-12 that is important, high flame retardancy also being desirable.

To the extent that glass fibers are used in the abovementioned specifications, they can be conventional continuous-filament fibers (rovings) or chopped fibers (fiber bundles of length from 4 to 6 mm). Shear in the extruder then gives a glassfiber length distribution in the product which is about 250-300 µm for conventional processing (based on a product with 25% glassfiber content). A factor that has to be considered here is that the average fiber length generally falls as fiber content increases, since this results in an increased level of fiber interactions in the incorporation zone and thus to an increased level of fiber breakage (F. Raumsteiner, R. Theysohn, Comp. Sci. Techn. 23 (1985) 231).

At glassfiber contents greater than 20% by weight, addition of melamine cyanurate as flame retardant usually becomes insufficient for the glow-wire test to be passed at low wall thicknesses.

A SUMMARY OF THE INVENTION

The invention relates to a thermoplastic molding composition comprising
A) from 29 to 97.5% by weight of a thermoplastic polyamide,
B) from 1 to 20% by weight of melamine cyanurate,
C) from 0.5 to 10% by weight of an organic phosphorus compound based on 9,10-dihydro-9-oxa-10-phosphaphenanthrene oxide (DOPO) as parent structure,
D) from 1 to 50% by weight of a fibrous filler, the aspect ratio (L/D) of which is from 4 to 25, and the arithmetic average fiber length of which is from 40 to 250 µm, and
E) from 0 to 50% by weight of further additives,
where the total of the percentages by weight of components A) to E) does not exceed 100%.

It was therefore an object of the present invention to provide flame-retardant thermoplastic molding compositions which have good mechanical properties and good flame retardancy. In particular, addition of short glass fibers with a particular aspect ratio should be capable of giving flame retardancy that results in minimum afterflame times in the glow-wire test.

A DETAILED DESCRIPTION OF THE INVENTION

Accordingly, the molding compositions defined in the introduction have been discovered. Preferred embodiments can be found in the dependent claims.

Surprisingly, it has been found that polyamide mixtures with short glass fibers having a particular aspect ratio, together with a synergistic mixture made of melamine cyanurate and a derivative of 9,10-dihydro-9-oxa-10-phosphaphenanthrene oxide (DOPO) comply with the glow-wire requirements at low wall thicknesses even when glassfiber contents are greater than 20% by weight.

The molding compositions of the invention comprise, as component A), from 20 to 97.5% by weight, preferably from 40 to 93% by weight, and in particular from 40 to 84% by weight, of at least one polyamide.

The polyamides of the molding compositions of the invention generally have an intrinsic viscosity of from 90 to 350 ml/g, preferably from 110 to 240 ml/g, determined in a 0.5% strength by weight solution in 96% strength by weight sulfuric acid at 25° C. to ISO 307.

Preference is given to semicrystalline or amorphous resins with a molecular weight (weight average) of at least 5000, as described by way of example in the following U.S. Pat. Nos. 2,071,250, 2,071,251, 2,130,523, 2,130,948, 2,241,322, 2,312,966, 2,512,606, and 3,393,210.

Examples of these are polyamides that derive from lactams having from 7 to 13 ring members, e.g. polycaprolactam, polycapryllactam, and polylaurolactam, and also polyamides obtained via reaction of dicarboxylic acids with diamines.

Dicarboxylic acids which may be used are alkanedicarboxylic acids having 6 to 12, in particular 6 to 10, carbon atoms, and aromatic dicarboxylic acids. Merely as examples, acids that may be mentioned here are adipic acid, azelaic acid, sebacic acid, dodecanedioic acid and terephthalic and/or isophthalic acid.

Particularly suitable diamines are alkanediamines having from 6 to 12, in particular from 6 to 8, carbon atoms, and also m-xylylenediamine (e.g. Ultramid® X17 from BASF SE, where the molar ratio of MXDA to adipic acid is 1:1), di(4-aminophenyl)methane, di(4-aminocyclohexyl)methane, 2,2-di(4-aminophenyl)propane, 2,2-di(4-aminocyclohexyl)propane, and 1,5-diamino-2-methylpentane.

Preferred polyamides are polyhexamethyleneadipamide, polyhexamethylenesebacamide, and polycaprolactam, and also nylon-6/6,6 copolyamides, in particular having a proportion of from 5 to 95% by weight of caprolactam units (e.g. Ultramid® C31 from BASF SE).

Other suitable polyamides are obtainable from w-aminoalkylnitriles, e.g. aminocapronitrile (PA 6) and adipodinitrile with hexamethylenediamine (PA 66) via what is known as direct polymerization in the presence of water, for example as described in DE-A 10313681, EP-A 1198491 and EP 922065.

Mention may also be made of polyamides obtainable, by way of example, via condensation of 1,4-diaminobutane with adipic acid at an elevated temperature (nylon-4,6). Preparation processes for polyamides of this structure are described by way of example in EP-A 38 094, EP-A 38 582, and EP-A 39 524.

Other suitable examples are polyamides obtainable via copolymerization of two or more of the abovementioned monomers, and mixtures of two or more polyamides in any desired mixing ratio. Particular preference is given to mixtures of nylon-6,6 with other polyamides, in particular nylon-6/6,6 copolyamides.

Other copolyamides which have proven particularly advantageous are semiaromatic copolyamides, such as PA 6/6T and PA 66/6T, where the triamine content of these is less than 0.5% by weight, preferably less than 0.3% by weight (see EP-A 299 444). Other polyamides resistant to high temperatures are known from EP-A 19 94 075 (PA 6T/6I/MXD6).

The processes described in EP-A 129 195 and 129 196 can be used to prepare the preferred semiaromatic copolyamides with low triamine content.

The following list, which is not comprehensive, comprises the polyamides A) mentioned and other polyamides A) for the purposes of the invention, and the monomers comprised:
AB Polymers:
PA 4 Pyrrolidone
PA 6 ε-Caprolactam
PA 7 Ethanolactam
PA 8 Capryllactam
PA 9 9-Aminopelargonic acid
PA 11 11-Aminoundecanoic acid
PA 12 Laurolactam
AA/BB Polymers:
PA 46 Tetramethylenediamine, adipic acid
PA 66 Hexamethylenediamine, adipic acid
PA 69 Hexamethylenediamine, azelaic acid
PA 610 Hexamethylenediamine, sebacic acid
PA 612 Hexamethylenediamine, decanedicarboxylic acid
PA 613 Hexamethylenediamine, undecanedicarboxylic acid
PA 1212 1,12-Dodecanediamine, decanedicarboxylic acid
PA 1313 1,13-Diaminotridecane, undecanedicarboxylic acid
PA 6T Hexamethylenediamine, terephthalic acid
PA 9T 1,9-Nonanediamine, terephthalic acid
PA MXD6 m-Xylylenediamine, adipic acid
AA/BB Polymers
PA 6I Hexamethylenediamine, isophthalic acid
PA 6-3-T Trimethylhexamethylenediamine, terephthalic acid
PA 6/6T (see PA 6 and PA 6T)
PA 6/66 (see PA 6 and PA 66)
PA 6/12 (see PA 6 and PA 12)
PA 66/6/610 (see PA 66, PA 6 and PA 610)
PA 6I/6T (see PA 6I and PA 6T)
PA PACM 12 Diaminodicyclohexylmethane, laurolactam
PA 6I/6T/PACM as PA 6I/6T+diaminodicyclohexylmethane
PA 12/MACMI Laurolactam, dimethyldiaminodicyclohexylmethane, isophthalic acid
PA 12/MACMT Laurolactam, dimethyldiaminodicyclohexylmethane, terephthalic acid
PA PDA-T Phenylenediamine, terephthalic acid Other monomers that can be used are cyclic diamines such as those of the general formula

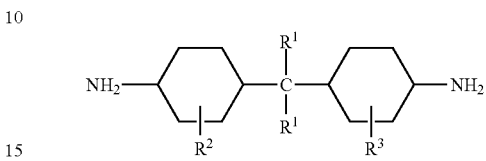

in which
$R^1$ is hydrogen or a $C_1$-$C_4$-alkyl group,
$R^2$ is a $C_1$-$C_4$-alkyl group or hydrogen, and
$R^3$ is a $C_1$-$C_4$-alkyl group or hydrogen.

Particularly preferred diamines are bis(4-aminocyclohexyl)methane, bis(4-amino-3-methylcyclohexyl)methane, bis(4-aminocyclohexyl)-2,2-propane, and bis(4-amino-3-methylcyclohexyl)-2,2-propane.

Other diamines that may be mentioned are 1,3- and 1,4-cyclohexanediamine and isophoronediamine.

It is also possible to use mixtures of above polyamides.

The thermoplastic molding compositions of the invention comprise, as component B), from 1 to 20% by weight, preferably from 1 to 15% by weight, and in particular from 5 to 10% by weight, of melamine cyanurate.

The melamine cyanurate suitable in the invention (component B) is a reaction product of preferably equimolar amounts of melamine (formula I) and cyanuric acid or isocyanuric acid (formulae Ia and Ib)

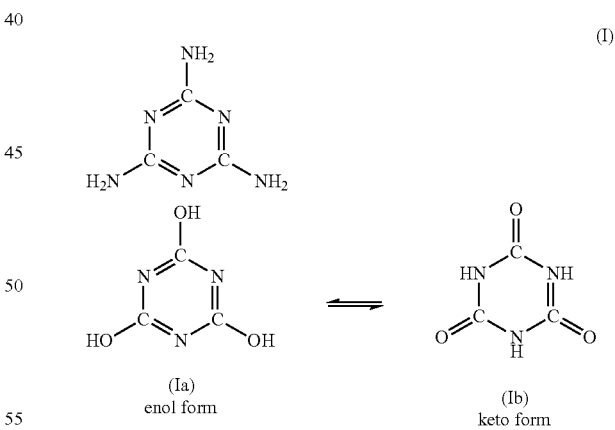

It is obtained by way of example via reaction of aqueous solutions of the starting compounds at from 90 to 100° C. The commercially available product is a white powder with average grain size $d_{50}$ of from 1.5 to 7 μm.

The molding compositions of the invention comprise, as component C), from 1 to 30% by weight, preferably from 1 to 20% by weight, and in particular from 5 to 20% by weight, of an organic phosphorus compound based on 9,10-dihydro-9-oxa-10-phosphaphenanthrene oxide (DOPO) as parent structure:

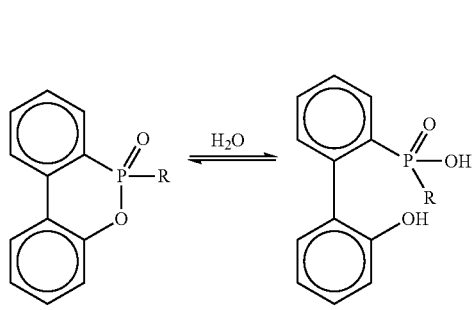

hydrolysis product from IIa
where
R=H or halogen, or an aliphatic or aromatic radical having from 1 to 18 carbon atoms.

The compound where R=H (IIa) is obtainable as in WO 97/878 and is available commercially as Ukanol® DOP.

The expression "as parent structure" is intended to mean that the monomeric compounds comprise at least one unit of the formula IIa, and oligomeric and polymeric derivatives comprise at least one compound of the formula IIa in the repeat unit.

Suitable DOPO compounds C) are:

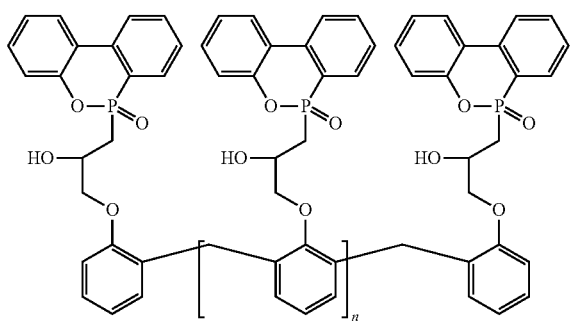

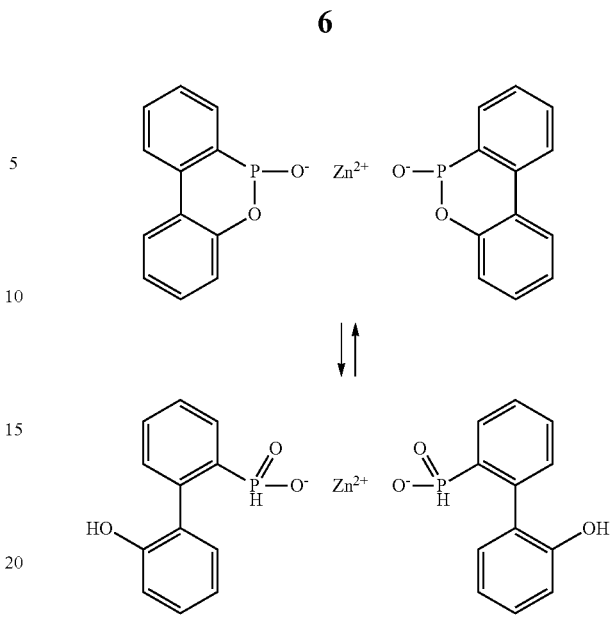

Preference is further given to

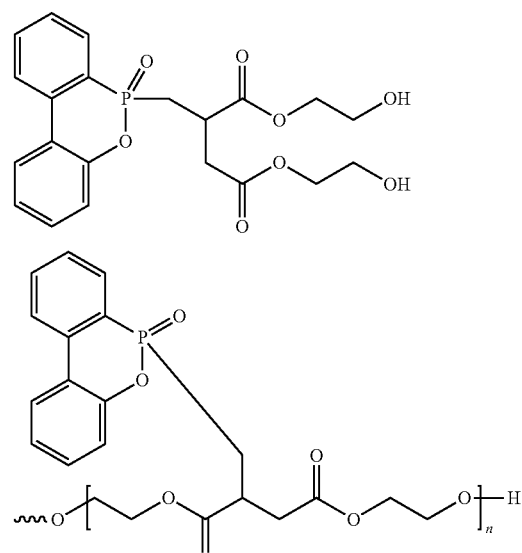

n = from 5 to 130

Both abovementioned compounds are obtainable from the following reaction:

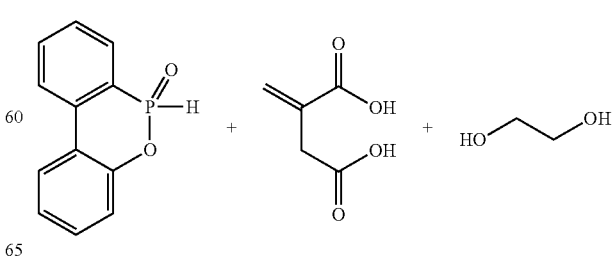

Further suitable compounds are:
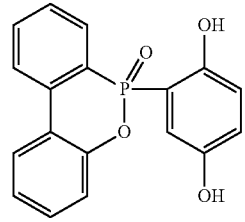
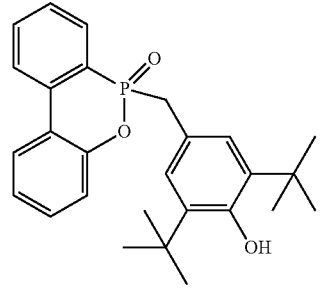
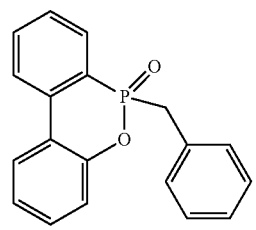
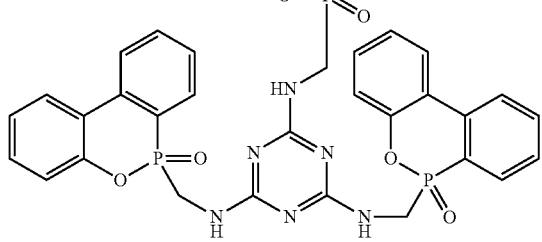
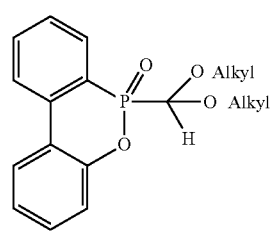
Alkyl=from 1 to 8 carbon atoms, preferably from 1 to 4 carbon atoms
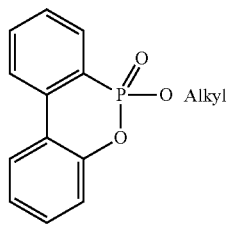
Alkyl=from 1 to 8 carbon atoms, preferably from 1 to 4 carbon atoms
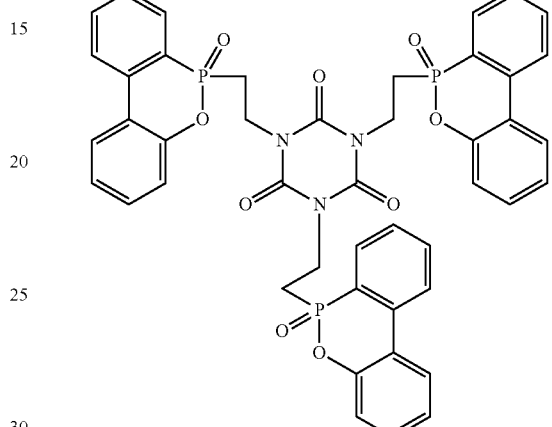
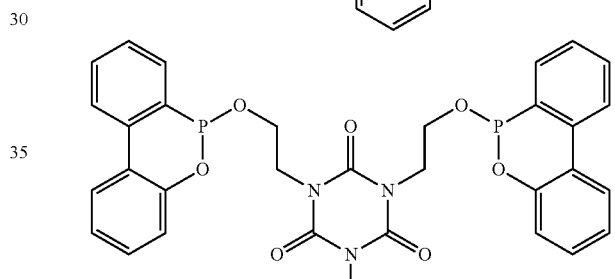
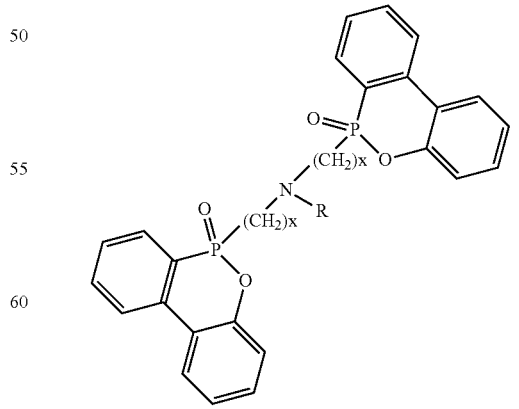
x = from 2 to 10
R = C$_1$ to C$_8$-alkyl, benzyl

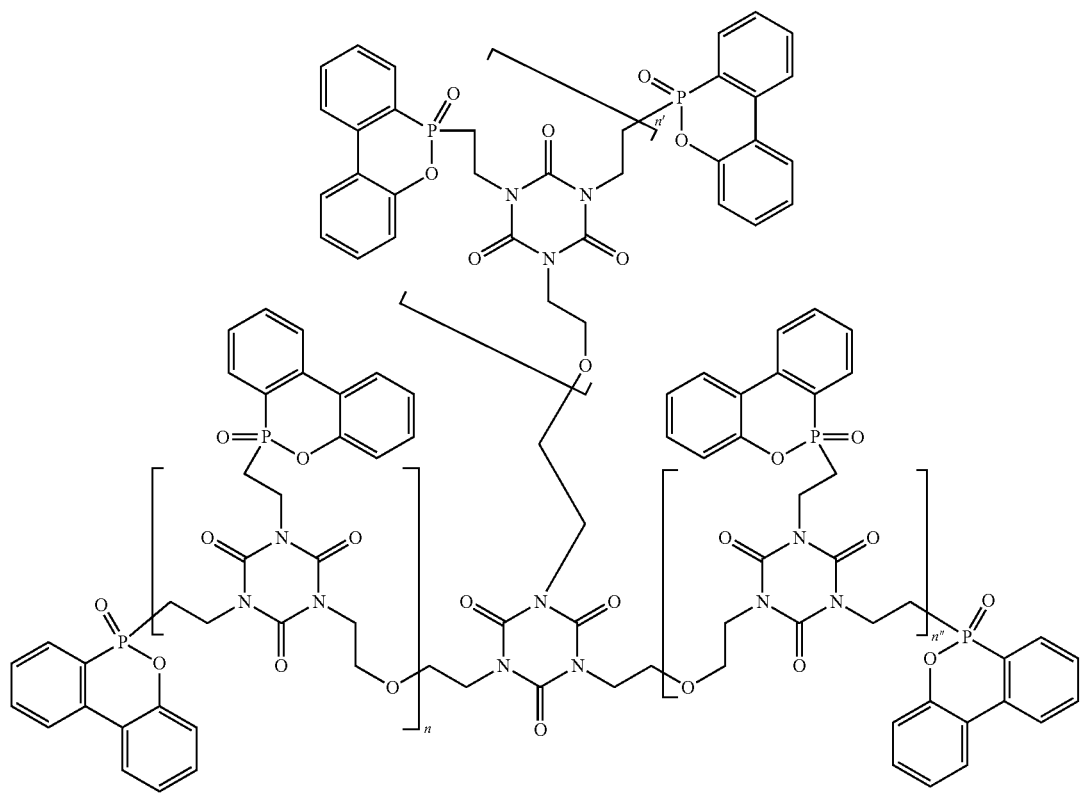
n, n′, n″ = integers from 0 to 20
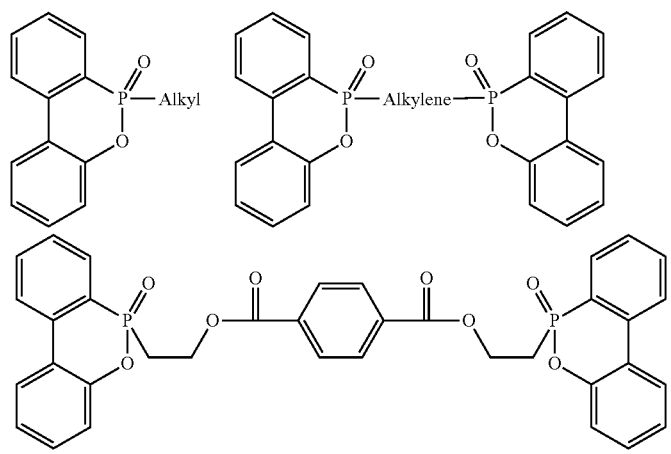
alkylene radical e.g. $C_2$-$C_6$
Alkyl = $C_1$-$C_{18}$
Mannich-type reactions lead to the following derivatives
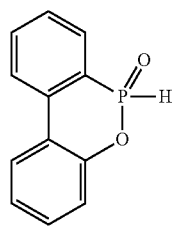
+  + HNRR′
↓
-continued
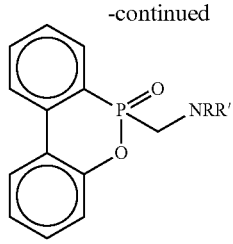
where R and R′ are, mutually independently,
H, $C_1$-$C_8$-alkyl,
$C_1$-$C_8$-hydroxyalkyl,
$C_2$-$C_4$-carboxyalkyl.

Preference is given to Me, Et, CH$_2$OH, CH$_2$CH$_2$OH, CH$_2$CO$_2$H, CH$_2$CO$_2$Et, CH$_2$CO$_2$Me as radical R or R'.
Other preferred DOPO derivatives are
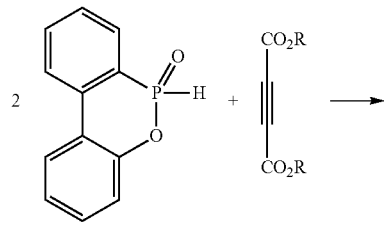 → 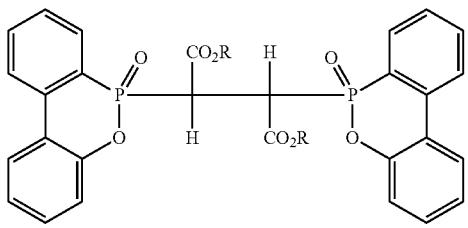
where R=C$_1$ to C$_4$-alkyl
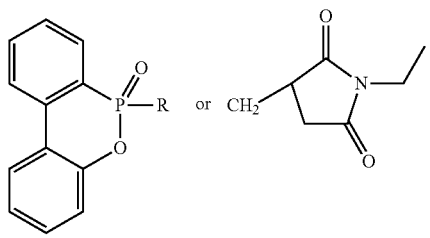
R = benzyl, phenyl
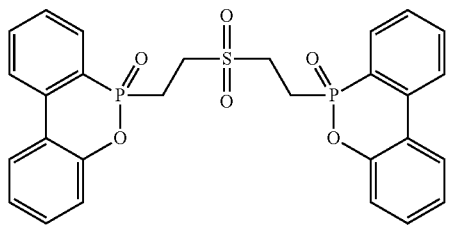 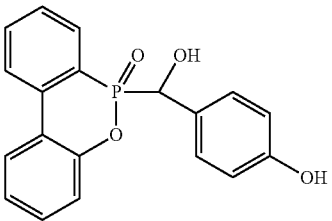
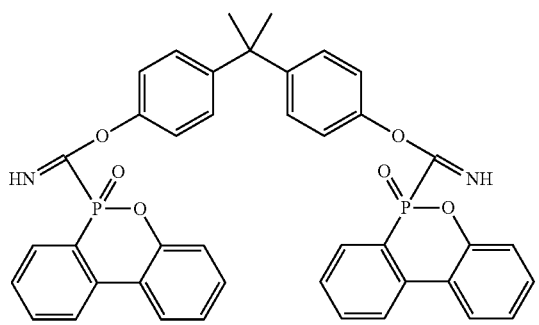
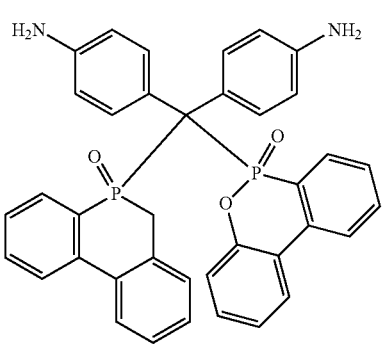 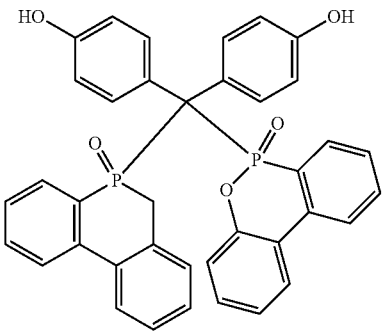

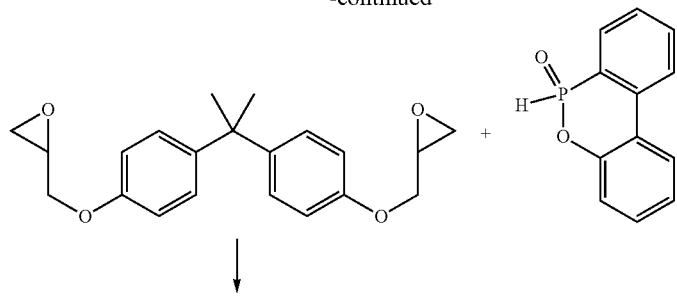
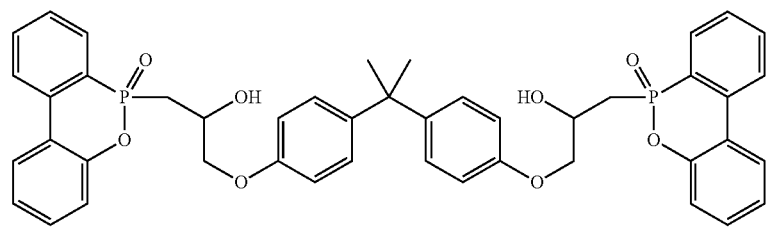
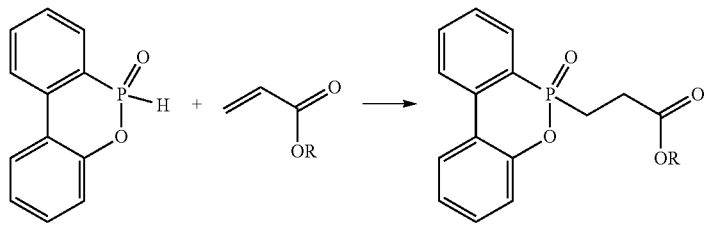
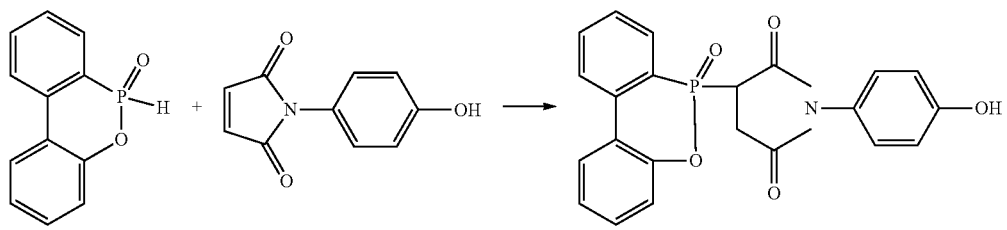
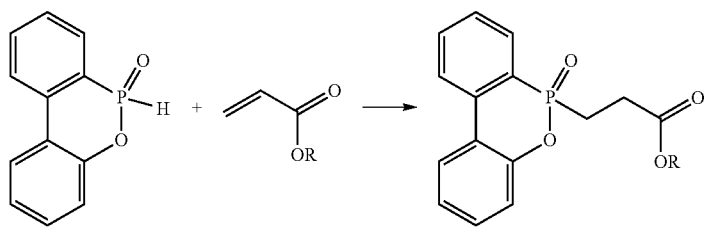
where R=C1 to C4-alkyl and subsequent transesterification using polyols, and also
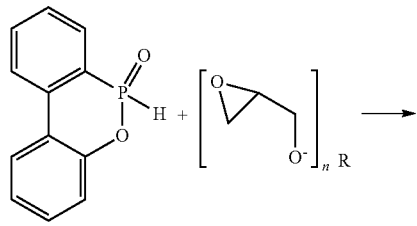
n = from 2 to 4
R = $C_2$-$C_8$-alkylene, preferably 1,4-butylene
or
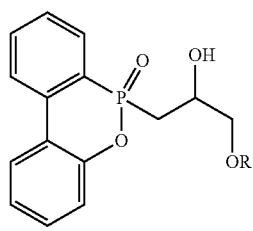
and $C_6$-$C_{20}$-arylene,
and subsequent transesterification using (meth)acrylates.
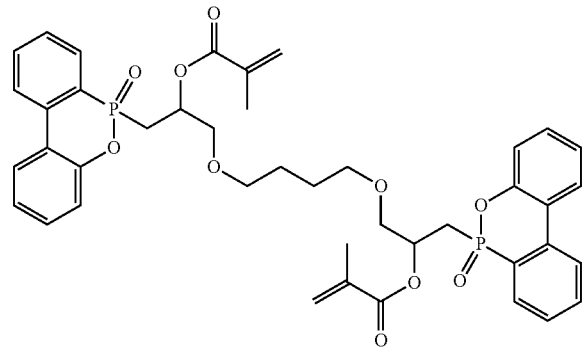
-continued
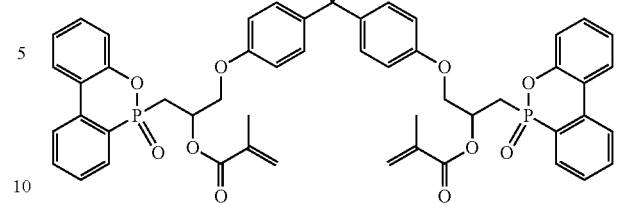
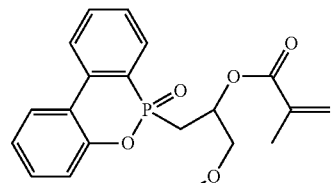
Preferred components C) are oligomers of the formula
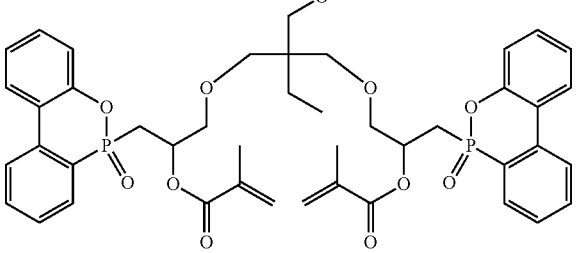
n = from 50 to 100, particularly preferably from 60 to 80
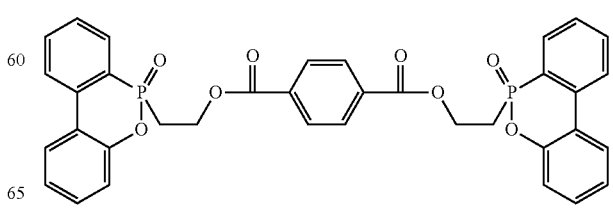

or adducts using hydroxyethylisocyanuric acid of the formula

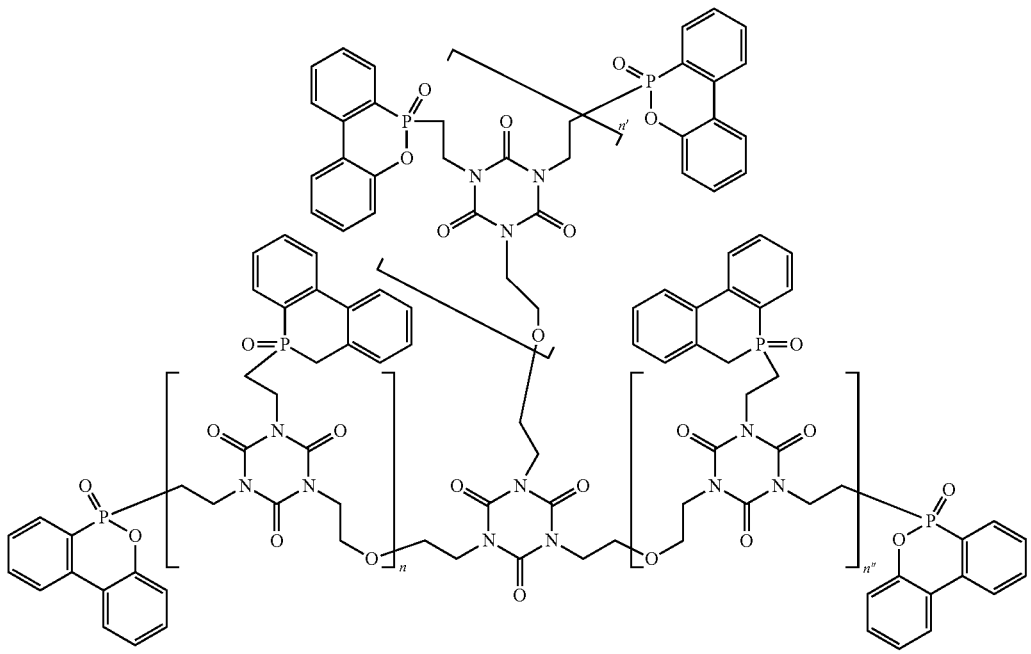

n, n′, n″ = integers from 0 to 20 or oligomers of DOPO with acrylates of the formula

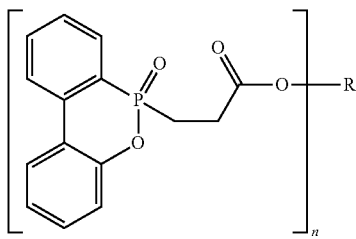

n = from 2 to 4
R = $C_2$-$C_{12}$-alkylene
$C_6$-$C_{15}$-arylene or a mixture of these.

Processes for producing component C) are familiar to the person skilled in the art, and further details would therefore be superfluous.

The molding compositions of the invention comprise, as component D), from 1 to 50% by weight, preferably from 5 up to 40% by weight, and in particular from 10 to 35% by weight, of a fibrous filler with an aspect ratio of from 4 to 25 and with an arithmetic average fiber length ($d_{50}$ value) of from 50 to 250 μm, preferably from 50 to 150 μm, and in particular from 60 to 120 μm.

The average fiber diameter is generally from 5 to 25 μm, preferably from 6 to 20 μm, and in particular from 9 to 18 μm. The preferred aspect ratio is accordingly from 4 to 20, from 5 to 15, and in particular from 6 to 13.

Adjustment of the desired fiber length can by way of example be achieved via grinding in a ball mill or chopper mill, whereupon a fiber length distribution is produced. If the average fiber length is smaller than 200 μm, the fiber length reduction gives a loose flowable product which can be incorporated into the polymer by mixing, as if it were a powder. Because the fiber length is low, only a slight further reduction in fiber length occurs during the incorporation process. Fiber content is usually determined after ashing of the polymer. To determine the fiber length distribution, the ash residue is generally taken up in silicone oil and photographs are prepared, using a microscope. From the images it is possible to measure the length of at least 500 fibers and to calculate the arithmetic average value and/or $d_{50}$ value (median). It is also possible to determine the $d_{10}$ and $d_{90}$ values for the glassfiber length distribution simultaneously with determination of the $d_{50}$ value.

Accordingly, the aspect ratio can be determined from the abovementioned measurement method.

The $d_{50}$ value or median value is the measure used for the average fiber length, and this means that 50% by volume of the specimen are shorter than $d_{50}$ and that the other 50% are longer. $d_{10}$ and $d_{90}$ analogously describe the shorter and, respectively, the longer fiber content of the sample.

Preferred fibrous fillers that may be mentioned are carbon fibers, aramid fibers, and potassium titanate fibers, particular preference being given here to glass fibers in the form of E glass, These can be used in the form of rovings or chopped glass in the forms commercially available.

The fibrous fillers may have been surface-pretreated with a silane compound to improve compatibility with the thermoplastic.

Suitable silane compounds have the general formula:

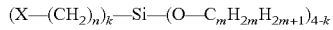

$(X-(CH_2)_n)_k-Si-(O-C_mH_{2m}H_{2m+1})_{4-k}$ where the definitions of the substituents are as follows:

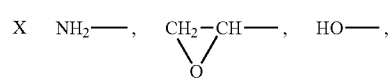

n is an integer from 2 to 10, preferably 3 to 4,
m is an integer from 1 to 5, preferably 1 to 2, and
k is an integer from 1 to 3, preferably 1.

Preferred silane compounds are aminopropyltrimethoxysilane, aminobutyltrimethoxysilane, aminopropyltriethoxysilane and aminobutyltriethoxysilane, and also the corresponding silanes which comprise a glycidyl group as substituent X.

The amounts of the silane compounds generally used for surface-coating are from 0.01 to 2% by weight, preferably from 0.025 to 1.0% by weight and in particular from 0.05 to 0.5% by weight (based on D)).

Acicular mineral fillers are also suitable,

For the purposes of the invention, acicular mineral fillers are mineral fillers with strongly developed acicular character. An example is acicular wollastonite. The mineral preferably has an L/D (length to diameter) ratio of from 8:1 to 35:1, preferably from 8:1 to 11:1. The mineral filler may optionally have been pretreated with the abovementioned silane compounds, but the pretreatment is not essential.

The molding compositions of the invention can preferably comprise, as component E), up to 30% by weight of further additives.

The material can comprise amounts of from 1 to 50% by weight, preferably from 5 to 40% by weight, of particulate fillers that differ from D.

Suitable fillers that may be mentioned are kaolin, calcined kaolin, wollastonite, talc and chalk, and also lamellar or acicular nanofillers, the amounts of these preferably being from 0.1 to 10%. Materials preferred for this purpose are boehmite, bentonite, montmorillonite, vermiculite, hectorite, and laponite. The lamellar nanofillers are organically modified by prior-art methods, to give them good compatibility with the organic binder.

The molding compositions of the invention can comprise, as component E), from 0.05 to 3% by weight, preferably from 0.1 to 1.5% by weight, and in particular from 0.1 to 1% by weight, of a lubricant.

Preference is given to the salts of Al, of alkali metals, or of alkaline earth metals, or esters or amides of fatty acids having from 10 to 44 carbon atoms, preferably having from 12 to 44 carbon atoms.

The metal ions are preferably alkaline earth metal and Al, particular preference being given to Ca or Mg.

Preferred metal salts are Ca stearate and Ca montanate, and also Al stearate.

It is also possible to use a mixture of various salts, in any desired mixing ratio.

The carboxylic acids can be monobasic or dibasic. Examples which may be mentioned are pelargonic acid, palmitic acid, lauric acid, margaric acid, dodecanedioic acid, behenic acid, and particularly preferably stearic acid, capric acid, and also montanic acid (a mixture of fatty acids having from 30 to 40 carbon atoms).

The aliphatic alcohols can be monohydric to tetrahydric. Examples of alcohols are n-butanol, n-octanol, stearyl alcohol, ethylene glycol, propylene glycol, neopentyl glycol, pentaerythritol, preference being given to glycerol and pentaerythritol.

The aliphatic amines can be mono- to tribasic. Examples of these are stearylamine, ethylenediamine, propylenediamine, hexamethylenediamine, di(6-aminohexyl)amine, particular preference being given to ethylenediamine and hexamethylenediamine. Preferred esters or amides are correspondingly glycerol distearate, glycerol tristearate, ethylenediamine distearate, glycerol monopalmitate, glycerol trilaurate, glycerol monobehenate, and pentaerythritol tetrastearate.

It is also possible to use a mixture of various esters or amides, or of esters with amides in combination, in any desired mixing ratio.

The molding compositions of the invention can comprise, as component E), from 0.05 to 3% by weight, preferably from 0.1 to 1.5% by weight, and in particular from 0.1 to 1% by weight, of a copper stabilizer, preferably of a Cu(I) halide, in particular in a mixture with an alkali metal halide, preferably KI, in particular in the ratio 1:4, or of a Cu(I) halide bis (triphenylphosphine) complex, where these are optionally present in a mixture with alkali metal halides (e.g. KI), or of a sterically hindered phenol, or a mixture of these.

Preferred salts of monovalent copper used are cuprous acetate, cuprous chloride, cuprous bromide, and cuprous iodide. The materials comprise these in amounts of from 5 to 500 ppm of copper, preferably from 10 to 250 ppm, based on polyamide. The use of Cu complexes can in particular be advantageous for electrical properties.

The advantageous properties are in particular obtained if the copper is present with molecular distribution in the polyamide. This is achieved if a concentrate comprising the polyamide, and comprising a salt of monovalent copper, and comprising an alkali metal halide in the form of a solid, homogeneous solution is added to the molding composition. By way of example, a typical concentrate is composed of from 79 to 95% by weight of polyamide and from 21 to 5% by weight of a mixture composed of copper iodide or copper bromide and potassium iodide. The copper concentration in the solid homogeneous solution is preferably from 0.3 to 3% by weight, in particular from 0.5 to 2% by weight, based on the total weight of the solution, and the molar ratio of cuprous iodide to potassium iodide is from 1 to 11.5, preferably from 1 to 5.

Suitable polyamides for the concentrate are homopolyamides and copolyamides, in particular nylon-6 and nylon-6,6.

Suitable sterically hindered phenols E) are in principle all of the compounds which have a phenolic structure and which have at least one bulky group on the phenolic ring.

It is preferable to use, for example, compounds of the formula

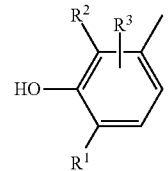

where:
R$^1$ and R$^2$ are an alkyl group, a substituted alkyl group, or a substituted triazole group, and where the radicals R$^1$ and R$^2$ may be identical or different, and R$^3$ is an alkyl group, a substituted alkyl group, an alkoxy group, or a substituted amino group.

Antioxidants of the abovementioned type are described by way of example in DE-A 27 02 661 (U.S. Pat. No. 4,360,617).

Another group of preferred sterically hindered phenols is derived from substituted benzenecarboxylic acids, in particular from substituted benzenepropionic acids.

Particularly preferred compounds from this class are compounds of the formula

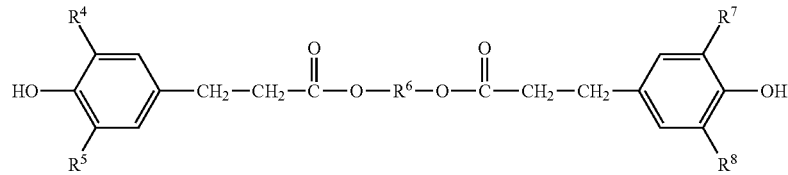

where $R^4$, $R^5$, $R^7$, and $R^8$, independently of one another, are $C_1$-$C_8$-alkyl groups which themselves may have substitution (at least one of these being a bulky group), and $R^6$ is a divalent aliphatic radical which has from 1 to 10 carbon atoms and whose main chain may also have C—O bonds.

Preferred compounds corresponding to these formulae are

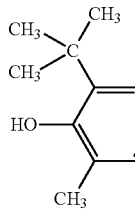 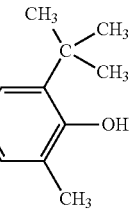

(Irganox® 245 from BASF SE)

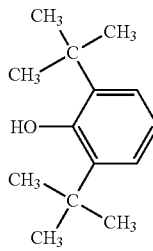 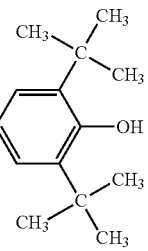

(Irganox® 259 from BASF SE)

All of the following should be mentioned as examples of sterically hindered phenols:

2,2'-methylenebis(4-methyl-6-tert-butylphenol), 1,6-hexanediol bis[3-(3,5-di-tert-butyl-4-hydroxyphenyl)propionate], pentaerythrityl tetrakis[3-(3,5-di-tert-butyl-4-hydroxy-phenol)propionate], distearyl 3,5-di-tert-butyl-4-hydroxybenzylphosphonate, 2,6,7-trioxa-1-phosphabicyclo[2.2.2]oct-4-ylmethyl 3,5-di-tert-butyl-4-hydroxyhydrocinnamate, 3,5-di-tert-butyl-4-hydroxyphenyl-3,5-distearylthiotriazylamine, 2-(2'-hydroxy-3'-hydroxy-3',5'-di-tert-butylphenyl)-5-chlorobenzotriazole, 2,6-di-tert-butyl-4-hydroxymethylphenol, 1,3,5-trimethyl-2,4,6-tris(3,5-di-tert-butyl-4-hydroxybenzyl)benzene, 4,4'-methylenebis(2,6-di-tert-butylphenol), 3,5-di-tert-butyl-4-hydroxybenzyldimethylamine.

Compounds which have proven particularly effective and which are therefore used with preference are 2,2'-methylenebis(4-methyl-6-tert-butylphenol), 1,6-hexanediol bis(3,5-di-tert-butyl-4-hydroxyphenyl)propionate (Irganox® 259), pentaerythrityl tetrakis[3-(3,5-di-tert-butyl-4-hydroxyphenyl)propionate], and also N,N'-hexamethylenebis-3,5-di-tert-butyl-4-hydroxyhydrocinnamide (Irganox® 1098), and the product Irganox® 245 described above from BASF SE, which has particularly good suitability.

The amount comprised of the antioxidants E), which can be used individually or as a mixture, is from 0.05 up to 3% by weight, preferably from 0.1 to 1.5% by weight, in particular from 0.1 to 1% by weight, based on the total weight of the molding compositions A) to E).

In some instances, sterically hindered phenols having not more than one sterically hindered group in ortho-position with respect to the phenolic hydroxy group have proven particularly advantageous; in particular when assessing colorfastness on storage in diffuse light over prolonged periods.

The molding compositions of the invention can comprise, as component E), from 0.05 to 5% by weight, preferably from 0.1 to 2% by weight, and in particular from 0.25 to 1.5% by weight, of a nigrosine.

Nigrosines are generally a group of black or gray phenazine dyes (azine dyes) related to the indulines and taking various forms (water-soluble, oil-soluble, spirit-soluble), used in wool dyeing and wool printing, in black dyeing of silks, and in the coloring of leather, of shoe creams, of varnishes, of plastics, of stoving lacquers, of inks, and the like, and also as microscopy stains.

Nigrosines are obtained industrially via heating of nitrobenzene, aniline, and aniline hydrochloride with metallic iron and $FeCl_3$ (the name being derived from the Latin niger=black), Component E) can be used in the form of free base or else in the form of salt (e.g. hydrochloride), Further details concerning nigrosines can be found by way of example in the electronic encyclopedia Römpp Online, Version 2.8, Thieme-Verlag Stuttgart, 2006, keyword "Nigrosin".

Examples of other conventional additives E) are amounts of up to 25% by weight, preferably up to 20% by weight, of elastomeric polymers (also often termed impact modifiers, elastomers, or rubbers).

These are very generally copolymers preferably composed of at least two of the following monomers: ethylene, propylene, butadiene, isobutene, isoprene, chloroprene, vinyl acetate, styrene, acrylonitrile and acrylates and/or methacrylates having from 1 to 18 carbon atoms in the alcohol component.

Polymers of this type are described, for example, in Houben-Weyl, Methoden der organischen Chemie, Vol, 14/1 (Georg-Thieme-Verlag, Stuttgart, Germany, 1961), pages 392-406, and in the monograph by C. B. Bucknall, "Toughened Plastics" (Applied Science Publishers, London, UK, 1977).

Some preferred types of such elastomers are described below.

Preferred types of such elastomers are those known as ethylene-propylene (EPM) and ethylene-propylene-diene (EPDM) rubbers.

EPM rubbers generally have practically no residual double bonds, whereas EPDM rubbers may have from 1 to 20 double bonds per 100 carbon atoms.

Examples which may be mentioned of diene monomers for EPDM rubbers are conjugated dienes, such as isoprene and butadiene, non-conjugated dienes having from 5 to 25 carbon atoms, such as 1,4-pentadiene, 1,4-hexadiene, 1,5-hexadiene, 2,5-dimethyl-1,5-hexadiene and 1,4-octadiene, cyclic dienes, such as cyclopentadiene, cyclohexadienes, cyclooctadienes and dicyclopentadiene, and also alkenylnorbornenes, such as 5-ethylidene-2-norbornene, 5-butylidene-2-norbornene, 2-methallyl-5-norbornene and 2-isopropenyl-5-norbornene, and tricyclodienes, such as 3-methyltricyclo[5.2.1.0$^{2,6}$]-3,8-decadiene, and mixtures of these.

Preference is given to 1,5-hexadiene, 5-ethylidenenorbornene and dicyclopentadiene. The diene content of the EPDM rubbers is preferably from 0.5 to 50% by weight, in particular from 1 to 8% by weight, based on the total weight of the rubber.

EPM rubbers and EPDM rubbers may preferably also have been grafted with reactive carboxylic acids or with derivatives of these. Examples of these are acrylic acid, methacrylic acid and derivatives thereof, e.g. glycidyl(meth)acrylate, and also maleic anhydride.

Copolymers of ethylene with acrylic acid and/or methacrylic acid and/or with the esters of these acids are another group of preferred rubbers. The rubbers may also comprise dicarboxylic acids, such as maleic acid and fumaric acid, or derivatives of these acids, e.g. esters and anhydrides, and/or monomers comprising epoxy groups. These monomers comprising dicarboxylic acid derivatives or comprising epoxy groups are preferably incorporated into the rubber by adding to the monomer mixture monomers comprising dicarboxylic acid groups and/or epoxy groups and having the general formula I or II or III or IV

  (I)

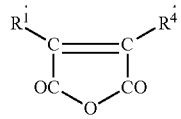  (II)

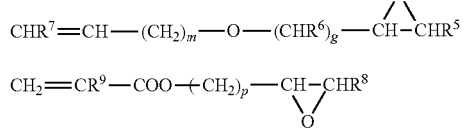  (III)

(IV)

where $R^1$ to $R^9$ are hydrogen or alkyl groups having from 1 to 6 carbon atoms, and m is an integer from 0 to 20, g is an integer from 0 to 10 and p is an integer from 0 to 5.

The radicals $R^1$ to $R^9$ are preferably hydrogen, where m is 0 or 1 and g is 1. The corresponding compounds are maleic acid, fumaric acid, maleic anhydride, allyl glycidyl ether and vinyl glycidyl ether.

Preferred compounds of the formulae I, II and IV are maleic acid, maleic anhydride and (meth)acrylates comprising epoxy groups, such as glycidyl acrylate and glycidyl methacrylate, and the esters with tertiary alcohols, such as tert-butyl acrylate. Although the latter have no free carboxy groups, their behavior approximates to that of the free acids and they are therefore termed monomers with latent carboxy groups.

The copolymers are advantageously composed of from 50 to 98% by weight of ethylene, from 0.1 to 20% by weight of monomers comprising epoxy groups and/or methacrylic acid and/or monomers comprising acid anhydride groups, the remaining amount being (meth)acrylates.

Particular preference is given to copolymers composed of from 50 to 98% by weight, in particular from 55 to 95% by weight, of ethylene,
from 0.1 to 40% by weight, in particular from 0.3 to 20% by weight, of glycidyl acrylate and/or glycidyl methacrylate, (meth)acrylic acid and/or maleic anhydride, and
from 1 to 45% by weight, in particular from 5 to 40% by weight, of n-butyl acrylate and/or 2-ethylhexyl acrylate.

Other preferred (meth)acrylates are the methyl, ethyl, propyl, isobutyl and tert-butyl esters.

Comonomers which may be used alongside these are vinyl esters and vinyl ethers.

The ethylene copolymers described above may be prepared by processes known per se, preferably by random copolymerization at high pressure and elevated temperature. Appropriate processes are well known.

Other preferred elastomers are emulsion polymers whose preparation is described, for example, by Blackley in the monograph "Emulsion Polymerization". The emulsifiers and catalysts which can be used are known per se.

In principle it is possible to use homogeneously structured elastomers or else those with a shell structure. The shell-type structure is determined by the sequence of addition of the individual monomers. The morphology of the polymers is also affected by this sequence of addition.

Monomers which may be mentioned here, merely as examples, for the preparation of the rubber fraction of the elastomers are acrylates, such as n-butyl acrylate and 2-ethylhexyl acrylate, corresponding methacrylates, butadiene and isoprene, and also mixtures of these. These monomers may be copolymerized with other monomers, such as styrene, acrylonitrile, vinyl ethers and with other acrylates or methacrylates, such as methyl methacrylate, methyl acrylate, ethyl acrylate or propyl acrylate.

The soft or rubber phase (with a glass transition temperature of below 0° C.) of the elastomers may be the core, the outer envelope or an intermediate shell (in the case of elastomers whose structure has more than two shells). Elastomers having more than one shell may also have more than one shell composed of a rubber phase.

If one or more hard components (with glass transition temperatures above 20° C.) are involved, besides the rubber phase, in the structure of the elastomer, these are generally prepared by polymerizing, as principal monomers, styrene, acrylonitrile, methacrylonitrile, α-methylstyrene, p-methylstyrene, acrylates or methacrylates, such as methyl acrylate, ethyl acrylate or methyl methacrylate. Besides these, it is also possible to use relatively small proportions of other comonomers.

It has proven advantageous in some cases to use emulsion polymers which have reactive groups at their surfaces. Examples of groups of this type are epoxy, carboxy, latent carboxy, amino and amide groups, and also functional groups which may be introduced by concomitant use of monomers of the general formula

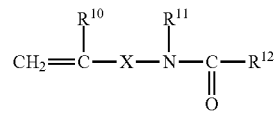

where the substituents can be defined as follows:
$R^{10}$ is hydrogen or a $C_1$-$C_4$-alkyl group,
$R^{11}$ is hydrogen, a $C_1$-$C_8$-alkyl group or an aryl group, in particular phenyl,
$R^{12}$ is hydrogen, a $C_1$-$C_{10}$-alkyl group, a $C_6$-$C_{12}$-aryl group, or —$OR^{13}$,
$R^{13}$ is a $C_1$-$C_8$-alkyl group or a $C_6$-$C_{12}$-aryl group, which can optionally have substitution by groups that comprise 0 or by groups that comprise N, X is a chemical bond, a $C_1$-$C_{10}$-alkylene group, or a $C_6$-$C_{12}$-arylene group, or

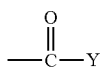

Y is O—Z or NH—Z, and
Z is a $C_1$-$C_{10}$-alkylene or $C_6$-$C_{12}$-arylene group.

The graft monomers described in ER-A 208 187 are also suitable for introducing reactive groups at the surface.

Other examples which may be mentioned are acrylamide, methacrylamide and substituted acrylates or methacrylates, such as (N-tert-butylamino)ethyl methacrylate, (N,N-dimethylamino)ethyl acrylate, (N,N-dimethylamino)methyl acrylate and (N,N-diethylamino)ethyl acrylate.

The particles of the rubber phase may also have been crosslinked. Examples of crosslinking monomers are 1,3-butadiene, divinylbenzene, diallyl phthalate and dihydrodicyclopentadienyl acrylate, and also the compounds described in EP-A 50 265.

It is also possible to use the monomers known as graft-linking monomers, i.e. monomers having two or more polymerizable double bonds which react at different rates during the polymerization. Preference is given to the use of compounds of this type in which at least one reactive group polymerizes at about the same rate as the other monomers, while the other reactive group (or reactive groups), for example, polymerize(s) significantly more slowly. The different polymerization rates give rise to a certain proportion of unsaturated double bonds in the rubber. If another phase is then grafted onto a rubber of this type, at least some of the double bonds present in the rubber react with the graft monomers to form chemical bonds, i.e. the phase grafted on has at least some degree of chemical bonding to the graft base.

Examples of graft-linking monomers of this type are monomers comprising allyl groups, in particular allyl esters of ethylenically unsaturated carboxylic acids, for example allyl acrylate, allyl methacrylate, diallyl maleate, diallyl fumarate and diallyl itaconate, and the corresponding monoallyl compounds of these dicarboxylic acids. Besides these there is a wide variety of other suitable graft-crosslinking monomers. For further details reference may be made here, for example, to U.S. Pat. No. 4,148,846.

The proportion of these crosslinking monomers in the impact-modifying polymer is generally up to 5% by weight, preferably not more than 3% by weight, based on the impact-modifying polymer.

Some preferred emulsion polymers are listed below. Mention may first be made here of graft polymers with a core and with at least one outer shell, and having the following structure:

| Type | Monomers for the core | Monomers for the envelope |
|---|---|---|
| I | 1,3-butadiene, isoprene, n-butyl acrylate, ethylhexyl acrylate, or a mixture of these | styrene, acrylonitrile, methyl methacrylate |
| II | as I, but with concomitant use of crosslinking agents | as I |
| III | as I or II | n-butyl acrylate, ethyl acrylate, methyl acrylate, 1,3-butadiene, isoprene, ethylhexyl acrylate |
| IV | as I or II | as I or III, but with concomitant use of monomers having reactive groups, as described herein |
| V | styrene, acrylonitrile, methyl methacrylate, or a mixture of these | first envelope composed of monomers as described under I and II for the core, second envelope as described under I or IV for the envelope |

Instead of graft polymers whose structure has more than one shell, it is also possible to use homogeneous, i.e. single-shell, elastomers composed of 1,3-butadiene, isoprene and n-butyl acrylate or of copolymers of these. These products, too, may be prepared by concomitant use of crosslinking monomers or of monomers having reactive groups.

Examples of preferred emulsion polymers are n-butyl acrylate-(meth)acrylic acid copolymers, n-butyl acrylate-glycidyl acrylate or n-butyl acrylate-glycidyl methacrylate copolymers, graft polymers with an inner core composed of n-butyl acrylate or based on butadiene and with an outer envelope composed of the abovementioned copolymers, and copolymers of ethylene with comonomers which supply reactive groups.

The elastomers described may also be prepared by other conventional processes, e.g. by suspension polymerization.

Preference is also given to silicone rubbers, as described in DE-A 37 25 576, EP-A 235 690, DE-A 38 00 603 and EP-A 319 290.

It is, of course, also possible to use mixtures of the types of rubber listed above.

The thermoplastic molding compositions of the invention can comprise, as component E), conventional processing aids, such as stabilizers, oxidation retarders, agents to counteract decomposition by heat and decomposition by ultraviolet light, lubricants and mold-release agents, colorants, such as dyes and pigments, nucleating agents, plasticizers, etc.

Examples of oxidation retarders and heat stabilizers are sterically hindered phenols and/or phosphites and amines (e.g. TAD), hydroquinones, aromatic secondary amines, such as diphenylamines, various substituted members of these groups, and mixtures of these, in concentrations of up to 1% by weight, based on the weight of the thermoplastic molding compositions.

UV stabilizers that may be mentioned, the amounts of which used are generally up to 2% by weight, based on the molding composition, are various substituted resorcinols, salicylates, benzotriazoles, and benzophenones.

Materials that can be added as colorants are inorganic pigments, such as titanium dioxide, ultramarine blue, iron oxide, and carbon black, and also organic pigments, such as phthalocyanines, quinacridones, perylenes, and also dyes, such as anthraquinones.

Materials that can be used as nucleating agents are sodium phenylphosphinate, aluminum oxide, silicon dioxide, and also preferably talc.

The thermoplastic molding compositions of the invention can be produced by processes known per se, by mixing the starting components in conventional mixing apparatus, such as screw-based extruders, Brabender mixers, or Banbury mixers, and then extruding the same. After extrusion, the extrudate can be cooled and pelletized. It is also possible to premix individual components and then to add the remaining starting materials individually and/or likewise in the form of a mixture. The mixing temperatures are generally from 230 to 320° C.

In another preferred mode of operation, components B), C), and D), and also optionally E), can be mixed with a prepolymer, compounded, and pelletized. The resultant pellets are then solid-phase condensed under an inert gas continuously or batchwise at a temperature below the melting point of component A) until the desired viscosity has been reached.

The thermoplastic molding compositions of the invention feature good flame retardancy and excellent glow-wire resistance.

They are suitable for producing fibers, foils, and moldings of any type. A few examples now follow: plug connectors, plugs, plug components, cable-harness components, circuit mounts, circuit-mount components, three-dimensionally injection-molded circuit mounts, electrical connector elements, and mechatronic components.

The moldings or semifinished products to be produced in the invention from the thermoplastic molding compositions can by way of example be used in the motor-vehicle industry, electrical industry, electronics industry, telecommunications industry, information technology industry, consumer electronics industry, or computer industry, in vehicles and in other means of conveyance, in ships, in spacecraft, in households, in office equipment, in sports, in medicine, and also generally in articles and parts of buildings, where these require relatively high fire-protection.

Improved-flow polyamides can be used for the kitchen and household sector to produce components for kitchen equipment, e.g. fryers, smoothing irons, and knobs, and also for applications in the garden and leisure sector.

Examples

The following components were used:
Component A/1: nylon-6 with intrinsic viscosity IV 125 ml/g, measured on a 0.5% strength by weight solution in 96% strength by weight sulfuric acid at 25° C. to ISO 307 (the material used being Ultramid® B24 from BASF SE).
Component N2: nylon-6 with intrinsic viscosity IV 150 ml/g, measured on a 0.5% strength by weight solution in 96% strength by weight sulfuric acid at 25° C. to ISO 307 (the material used being Ultramid® B27 from BASF SE).
Component A/3: nylon-6,6/6 copolymer composed of 9 parts of PA66 and 1 part of PA6 with intrinsic viscosity IV 145 ml/g, measured on a 0.5% strength by weight solution in 96% strength by weight sulfuric acid at 25° C. to ISO 307.
Component B: melamine cyanurate with average particle size $d_{50}$ ~2.6 μm (Melapur® MC 25 from BASF SE).
Component C: oligocondensate of

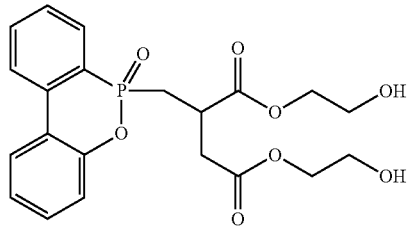 [SMILES: O=C(CC(CP1(=O)Oc2ccccc2-c2ccccc21)C(=O)OCCO)OCCO]

UKANOL®-FR50/1 (commercially available product from Schill & Seilacher).

Name: poly[oxy-1,2-ethanediyloxy[[(6-oxido-6H-dibenzo[c,e][1,2]oxaphosphorin-6-yl)methyl]-1,4-dioxo-1,4-butanediyl]], CAS No. 68816-19-3. The production process is described by way of example in WO2009/109347, in DE-A2646218, and in JP2000/336132.
Component D/1: standard chopped glass fiber for polyamides, L=4.0 mm, D=10 μm L/D: 400
Component D/2: short glass fiber, average length ($d_{50}$) ~210 μm, D=10 μm L/D 21.0
Component D/3: short glass fiber, average length ($d_{50}$) ~150 μm, diameter=14 μm L/D 10.7
Component E/1:
Irganox® 1098 from BASF SE, in all formulations, 0.3% of 3,3'-bis(3,5-di-tert-butyl-4-hydroxy-phenyl)-N,N'-hexamethylenedipropionamide (CAS No. 23128-74-7).
Component E/2:
In each case 0.25% by weight of Ca stearate (CAS 1592-23-0)
Component E/3:
In each case 0.12% by weight of N,N'-ethylenebisstearylamide
Component E/4:
In each case 2.53% by weight of Ti dioxide.
Production of Molding Compositions
The individual components were mixed in a ZSK 26 twin-screw extruder at throughput 20 kg/h and about 250-270° C. with flat temperature profile, discharged in the form of a strand, cooled until pelletizable, and pelletized.

The test specimens for the tests listed in Table 1 were injection-molded in an Arburg 420C injection-molding machine at a melt temperature of about 250-290° C. and at a mold temperature of about 80° C.

The flame retardancy of the molding compositions was firstly determined by the UL 94 method (Underwriters Laboratories Inc. Standard of Safety, "Test for Flammability of Plastic Materials for Parts in Devices and Appliances", pp. 14-18 Northbrook 1998).

Glow-wire resistance was determined by the glow wire ignition test in the form of 60695-2-12 GWFI (Glow Wire Flammability Index). For the GWFI test, on 3 test specimens (for example plaques measuring 60×60×1.0 mm, or disc) a glowing wire was used at temperatures of from 550 to 960° C. to determine the maximum temperature which, in 3 successive tests, does not lead to ignition even during the period of exposure to the glow wire. The test specimen is pressed for a period of 30 seconds with a force of 1 newton against a heated glow wire. The maximum penetration depth of the glow wire is 7 mm. The test is passed if the after flame time of the test specimen after removal of the glow wire is less than 30 seconds and if there is no ignition of a piece of tissue paper under the test specimen.

The tensile test was carried out to ISO 527, impact resistance was determined to ISO 179/1eU, and MVR was determined at 275° C. with 5 kg load to ISO 1133.

The table gives the constitutions of the molding compositions and the results of the tests.

TABLE

| Component/Test method [% by weight] | CE1 | CE2 | CE3 | CE4 | IE1 | IE2 | IE3 | IE4 |
|---|---|---|---|---|---|---|---|---|
| A/1 | | | 57.3 | | | | | |
| A/2 | 57.3 | 58.8 | | 57.3 | 57.3 | 57.3 | 62.3 | |
| A/3 | | | | | | | | 57.3 |
| B | 8 | 8 | 9.5 | 9.5 | 8 | 8 | 8 | 8 |
| C | 1.5 | | | | 1.5 | 1.5 | 1.5 | 1.5 |
| D/1 | 30 | | | | | | | |
| D/2 | | 30 | 30 | 30 | 30 | | | |
| D/3 | | | | | | 30 | 25 | 30 |
| E* total | 3.2 | 3.2 | 3.2 | 3.2 | 3.2 | 3.2 | 3.2 | 3.2 |

TABLE-continued

| Component/ Test method [% by weight] | CE1 | CE2 | CE3 | CE4 | IE1 | IE2 | IE3 | IE4 |
|---|---|---|---|---|---|---|---|---|
| Tensile modulus of elasticity [MPa] | 10350 | 8400 | 8550 | 5250 | 8350 | 8000 | 6800 | 8200 |
| Yield stress [MPa] | 138 | 110 | 110 | 106 | 102 | 94 | 90 | 98 |
| Tensile strain at break [%] | 2.2 | 2.5 | 2.2 | 2.4 | 2.0 | 2.6 | 3.1 | 2.9 |
| Impact resistance [kJ/m$^2$] | 41 | 42 | 37 | 41 | 31 | 33 | 37 | 25 |
| MVR [275° C./5 kg] [ml/10'] | 80 | 57 | 155 | 79 | 75 | 87 | 90 | 100 |
| Glassfiber length distribution in extruded pellets (arithmetic average fiber length) | 181 | 107 | 100 | 102 | 104 | 136 | 119 | 112 |
| Aspect ratio: Average fiber length/diameter | 18.1 | 10.7 | 10.0 | 10.2 | 10.4 | 9.7 | 8.5 | 8 |
| UL 94-V test (0.8 mm) | V-2 | V-2 | V-2 | V-2 | V-2 | V-2 | V-2 | V-2 |
| GWFI 960° C./ 1.0 mm | failed | failed | failed | failed | passed | passed | passed | passed |

The invention claimed is:

1. A thermoplastic molding composition comprising
   A) from 29 to 97.5% by weight of a thermoplastic polyamide,
   B) from 1 to 20% by weight of melamine cyanurate,
   C) from 0.5 to 10% by weight of an organic phosphorus compound based on 9,10-dihydro-9-oxa-10-phosphaphenanthrene oxide (DOPO) as parent structure, comprising, as component C, oligomers of the formula

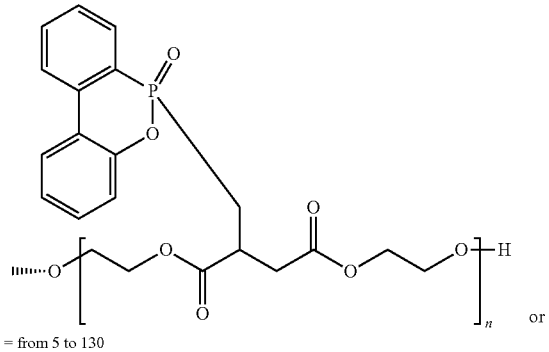

$n$ = from 5 to 130 or oligomers of DOPO with acrylates of the formula

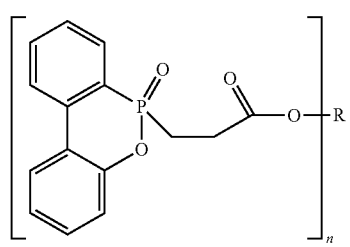

$n$ = from 2 to 4
R = $C_2$-$C_{12}$-alkylene
$C_6$-$C_{15}$-arylene or a mixture of these, D) from 1 to 50% by weight of a fibrous filler, the aspect ratio (L/D) of which is from 4 to 25, and the arithmetic average fiber length of which is from 40 to 250 µm, and
   E) from 0 to 50% by weight of further additives, where the total of the percentages by weight of components A) to E) does not exceed 100%.

2. The thermoplastic molding composition according to claim 1, comprising glass fibers, carbon fibers, or a mixture of these as component D).

3. The thermoplastic molding composition according to claim 1, in which the average particle size ($d_{50}$ value) of component B) is from 1.5 to 7 µm.

4. The thermoplastic molding composition according to claim 1, in which the L/D ratio of component D) is from 6 to 20.

5. The thermoplastic molding composition according to claim 1, in which the arithmetic average fiber length of component D) is from 50 to 150 µm.

6. The thermoplastic molding composition according to claim 2, in which the average particle size ($d_{50}$ value) of component B) is from 1.5 to 7 µm and the L/D ratio of component D) is from 6 to 20 and the arithmetic average fiber length of component D) is from 50 to 150 µm.

7. A process for producing fibers, foils, and moldings which comprises utilizing the thermoplastic molding compositions according to claim 1.

8. A fiber, foil, or molding produced from the thermoplastic molding compositions according to claim 1.

* * * * *